(12) United States Patent
Espel-Logan et al.

(10) Patent No.: US 12,469,279 B2
(45) Date of Patent: Nov. 11, 2025

(54) METHODS AND SYSTEMS FOR AUTOMATED VEHICLE SEAT REPLACEMENT

(71) Applicant: STATE FARM MUTUAL AUTOMOBILE INSURANCE COMPANY, Bloomington, IL (US)

(72) Inventors: Catherine Espel-Logan, Plano, TX (US); Brian Mark Fields, Phoenix, AZ (US); Joshua John Freitas, Peoria, AZ (US); Melissa Collette Miles, Normal, IL (US); Jeanne Koehler, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 122 days.

(21) Appl. No.: 18/416,279

(22) Filed: Jan. 18, 2024

(65) Prior Publication Data
US 2024/0273632 A1 Aug. 15, 2024

Related U.S. Application Data

(60) Provisional application No. 63/541,659, filed on Sep. 29, 2023, provisional application No. 63/530,418, (Continued)

(51) Int. Cl.
*G06Q 30/00* (2023.01)
*B60W 30/08* (2012.01)
(Continued)

(52) U.S. Cl.
CPC ............. *G06V 20/20* (2022.01); *B60W 30/08* (2013.01); *G06F 21/6218* (2013.01);
(Continued)

(58) Field of Classification Search
CPC ............ G06Q 50/184; G06Q 30/0643; G06Q 30/0621; G06Q 30/0631; G06Q 30/08;
(Continued)

(56) References Cited

U.S. PATENT DOCUMENTS 8,036,788 B2 * 10/2011 Breed .................. G07C 5/0808
701/31.9
8,712,893 B1 * 4/2014 Brandmaier ............ G06F 16/51
705/35
(Continued)

FOREIGN PATENT DOCUMENTS

EP 3239686 A1 11/2017
EP 3578433 B1 8/2020
(Continued)

*Primary Examiner* — Phutthiwat Wongwian
*Assistant Examiner* — Sherman D Manley
(74) *Attorney, Agent, or Firm* — MARSHALL, GERSTEIN & BORUN LLP

(57) ABSTRACT

Systems and methods for automatically evaluating a vehicle seat replacement after a vehicle collision. Upon detecting a vehicle collision is detected, obtaining vehicle seat condition data from vehicle seat sensors and vehicle condition data from vehicle sensors. Analyzing the vehicle seat condition data and/or the vehicle condition data to detect one or more collision conditions indicating (i) the vehicle is not drivable, (ii) a vehicle door proximate the vehicle seat is damaged, (iii) an airbag of the vehicle is deployed, and/or (iv) the vehicle seat is visibly damaged. In response to detecting the one or more collision conditions, generating a recommendation to replace the vehicle seat and providing the recommendation to a user device.

20 Claims, 5 Drawing Sheets

Related U.S. Application Data filed on Aug. 2, 2023, provisional application No. 63/524,035, filed on Jun. 29, 2023, provisional application No. 63/488,042, filed on Mar. 2, 2023, provisional application No. 63/445,879, filed on Feb. 15, 2023.

(51) Int. Cl.

| | | |
|---|---|---|
| *G06F 21/62* | (2013.01) | |
| *G06Q 30/0601* | (2023.01) | |
| *G06Q 40/08* | (2012.01) | |
| *G06T 7/00* | (2017.01) | |
| *G06T 7/292* | (2017.01) | |
| *G06T 7/70* | (2017.01) | |
| *G06T 19/00* | (2011.01) | |
| *G06V 10/70* | (2022.01) | |
| *G06V 20/20* | (2022.01) | |
| *G06V 20/40* | (2022.01) | |
| *G06V 20/59* | (2022.01) | |
| *H04L 9/00* | (2022.01) | |
| *H04L 9/30* | (2006.01) | |
| *H04N 21/472* | (2011.01) | |

(52) U.S. Cl.
CPC ..... *G06Q 30/0621* (2013.01); *G06Q 30/0631* (2013.01); *G06Q 40/08* (2013.01); *G06T 7/001* (2013.01); *G06T 7/292* (2017.01); *G06T 7/70* (2017.01); *G06T 19/006* (2013.01); *G06V 10/70* (2022.01); *G06V 20/41* (2022.01); *G06V 20/59* (2022.01); *H04L 9/3073* (2013.01); *H04L 9/50* (2022.05); *H04N 21/47217* (2013.01); *B60W 2756/10* (2020.02); *G06T 2207/10016* (2013.01); *G06T 2207/20081* (2013.01); *G06T 2207/30268* (2013.01)

(58) Field of Classification Search
CPC G06T 7/001; G06T 7/292; G06T 7/70; G06T 19/006; G06T 2207/10016; G06T 2207/20081; G06T 2207/30268; G06V 10/70; G06V 20/20; G06V 20/41; G06V 20/59; H04L 9/3073; H04L 9/50; H04L 9/3239; H04N 21/47217; B60Q 9/00; B60W 30/08

See application file for complete search history.

(56) References Cited

U.S. PATENT DOCUMENTS

| | | | |
|---|---|---|---|
| 9,721,400 B1* | 8/2017 | Oakes, III | G07C 5/0808 |
| 9,830,748 B2 | 11/2017 | Rosenbaum | |
| 9,990,782 B2 | 6/2018 | Rosenbaum | |
| 10,269,190 B2 | 4/2019 | Rosenbaum | |
| 10,339,728 B1* | 7/2019 | Oakes, III | G07C 5/0808 |
| 10,467,824 B2 | 11/2019 | Rosenbaum | |
| 11,227,452 B2 | 1/2022 | Rosenbaum | |
| 11,407,410 B2 | 8/2022 | Rosenbaum | |
| 11,524,707 B2 | 12/2022 | Rosenbaum | |
| 11,594,083 B1 | 2/2023 | Rosenbaum | |
| 12,012,061 B2* | 6/2024 | Stählin | B60R 16/0234 |
| 12,118,610 B2* | 10/2024 | Dutta | G06Q 30/0282 |
| 2003/0184143 A1* | 10/2003 | Cilliere | B60N 2/236 297/367 R |
| 2017/0148235 A1* | 5/2017 | Yakub | G07C 5/008 |
| 2020/0223385 A1* | 7/2020 | Brozovich | B60R 21/013 |
| 2022/0092893 A1 | 3/2022 | Rosenbaum | |
| 2022/0340148 A1 | 10/2022 | Rosenbaum | |
| 2023/0060300 A1 | 3/2023 | Rosenbaum | |
| 2024/0273922 A1* | 8/2024 | Espel-Logan | B60W 30/08 |

FOREIGN PATENT DOCUMENTS

| | | |
|---|---|---|
| EP | 3730375 B1 | 10/2021 |
| EP | 3960576 A1 | 3/2022 |
| EP | 4190659 A1 | 6/2023 |
| EP | 4190660 A1 | 6/2023 |

\* cited by examiner

METHODS AND SYSTEMS FOR AUTOMATED VEHICLE SEAT REPLACEMENT

CROSS-REFERENCE TO RELATED APPLICATIONS

This application claims priority to and the benefit of the filing date of provisional U.S. Patent Application No. 63/445,879 entitled "METHODS AND SYSTEMS FOR SIMULATING A VEHICLE SEAT IN A VEHICLE" filed Feb. 15, 2023; provisional U.S. Patent Application No. 63/488,042 entitled "METHODS AND SYSTEMS FOR AUTOMATED VEHICLE SEAT REPLACEMENT," filed on Mar. 2, 2023; provisional U.S. Patent Application No. 63/524,035 entitled "METHODS AND SYSTEMS FOR AUTOMATED MACHINE VISION MONITORING OF VEHICLE SEATS," filed on Jun. 29, 2023; provisional U.S. Patent Application No. 63/530,418 entitled "METHODS AND SYSTEMS FOR GENERATING, MAINTAINING, AND USING INFORMATION RELATED TO VEHICLE SEATS STORED ON A BLOCKCHAIN," filed Aug. 2, 2023; and provisional U.S. Patent Application No. 63/541,659 entitled "METHODS AND SYSTEMS OF USING AUGMENTED REALITY FOR VISUALIZING THE PROPER FASTENING OF A VEHICLE SEAT," filed Sep. 29, 2023, the entire contents of which is hereby expressly incorporated herein by reference.

FIELD OF THE INVENTION

The present disclosure generally relates to vehicle seat replacement, and more particularly, automatically evaluating a vehicle seat replacement after a vehicle collision.

BACKGROUND

Vehicle owners often may not know whether a vehicle seat, such as a car seat or booster seat for a child or infant, is safe for use after a vehicle collision. If a vehicle seat is damaged by the vehicle collision, it may create risks to persons or animals placed in the vehicle seat. Conventionally, vehicle owners may be left to manually evaluate the vehicle seat in an attempt to determine if the vehicle seat requires replacement. This may be inaccurate and lead to the inappropriate usage of damaged vehicle seats. The conventional post-collision vehicle seat evaluation techniques may include additional ineffectiveness, inefficiencies, encumbrances, and/or other drawbacks.

SUMMARY

The present embodiments may relate to, inter alia, systems and methods for automatically evaluating a vehicle seat replacement after a vehicle collision.

In one aspect, a computer-implemented method for automatically evaluating a vehicle seat replacement after a vehicle collision may be provided. The computer-implemented method may be implemented via one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer-implemented may include (1) detecting, by one or more processors and via one or more collision sensors, that a vehicle associated with the vehicle seat was involved in the vehicle collision; (2) obtaining, by the one or more processors and via one or more seat sensors, vehicle seat condition data indicating a vehicle seat condition; (3) obtaining, by the one or more processors and via one or more vehicle sensors, vehicle condition data indicating a vehicle condition; (4) analyzing, by the one or more processors, one or more of the vehicle seat condition data and/or the vehicle condition data to detect one or more vehicle conditions, the one or more vehicle conditions indicating that (i) the vehicle is not drivable, (ii) a vehicle door proximate the vehicle seat is damaged, (iii) an airbag of the vehicle is deployed, and/or (iv) the vehicle seat is visibly damaged; (5) in response to detecting the one or more vehicle conditions, generating, by the one or more processors, a recommendation to replace the vehicle seat; and/or (6) providing, by the one or more processors and to a user device, the recommendation to replace the vehicle seat. The method may include additional, less, or alternate functionality or actions, including those discussed elsewhere herein.

In another aspect, a computer system for automatically evaluating a vehicle seat replacement after a vehicle collision may be provided. The computer system may include one or more local or remote processors, servers, transceivers, sensors, memory units, mobile devices, wearables, smart watches, smart contact lenses, smart glasses, augmented reality glasses, virtual reality headsets, mixed or extended reality glasses or headsets, voice or chat bots, ChatGPT bots, and/or other electronic or electrical components, which may be in wired or wireless communication with one another. In one instance, the computer system may include one or more processors and one or more non-transitory memories storing processor-executable instructions that, when executed by the one or more processors, may cause the system to (1) detect via one or more collision sensors, that a vehicle associated with the vehicle seat was involved in the vehicle collision; (2) obtain via one or more seat sensors, vehicle seat condition data indicating a vehicle seat condition; (3) obtain via one or more vehicle sensors, vehicle condition data indicating a vehicle condition; (4) analyze one or more of the vehicle seat condition data and/or the vehicle condition data to detect one or more vehicle conditions, the one or more vehicle conditions indicating that (i) the vehicle is not drivable, (ii) a vehicle door proximate the vehicle seat is damaged, (iii) an airbag of the vehicle is deployed, and/or (iv) the vehicle seat is visibly damaged; (5) in response to detecting the one or more vehicle conditions, generate a recommendation to replace the vehicle seat; and/or (6) provide to a user device, the recommendation to replace the vehicle seat. The computer system may include additional, less, or alternate functionality, including that discussed elsewhere herein.

In another aspect, a non-transitory computer-readable medium storing processor-executable instructions that, when executed by one or more processors, may cause the one or more processors to (1) detect via one or more collision sensors, that a vehicle associated with the vehicle seat was involved in the vehicle collision; (2) obtain via one or more seat sensors, vehicle seat condition data indicating a vehicle seat condition; (3) obtain via one or more vehicle sensors, vehicle condition data indicating a vehicle condition; (4) analyze one or more of the vehicle seat condition data and/or the vehicle condition data to detect one or more vehicle conditions, the one or more vehicle conditions indicating that (i) the vehicle is not drivable, (ii) a vehicle door proximate the vehicle seat is damaged, (iii) an airbag of the vehicle is deployed, and/or (iv) the vehicle seat is visibly damaged; (5) in response to detecting the one or more vehicle conditions, generate a recommendation to replace the vehicle seat; and/or (6) provide to a user device, the recommendation to replace the vehicle seat. The instructions may direct additional, less, or alternate functionality, including that discussed elsewhere herein.

Additional, alternate and/or fewer actions, steps, features and/or functionality may be included in some aspects and/or embodiments, including those described elsewhere herein.

BRIEF DESCRIPTION OF THE DRAWINGS

The figures described below depict various aspects of the applications, methods, and systems disclosed herein. It should be understood that each figure depicts one embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Overview

The computer systems and methods disclosed herein generally relate to, inter alia, methods and systems for automated vehicle seat replacement. As it is generally used herein, the term "vehicle seat" refers to a seat placed upon the seats included by the original equipment manufacturer (OEM) of the vehicle, such as car seats and/or booster seats for infants and/or children, and kennels and/or other types of vehicle seats for pets.

Some embodiments may use techniques to automatically recommend a user replace a vehicle seat of a vehicle involved in a collision. This may include detecting the vehicle seat was involved in the vehicle collision. In one embodiment, this may include analyzing sensor data associated with the vehicle and/or vehicle seat to detect one or more collision conditions. In one embodiment, this may include generating a recommendation to replace the vehicle seat based upon the collision conditions, and providing the recommendation to a user device.

Exemplary Computer System

Figure 1:
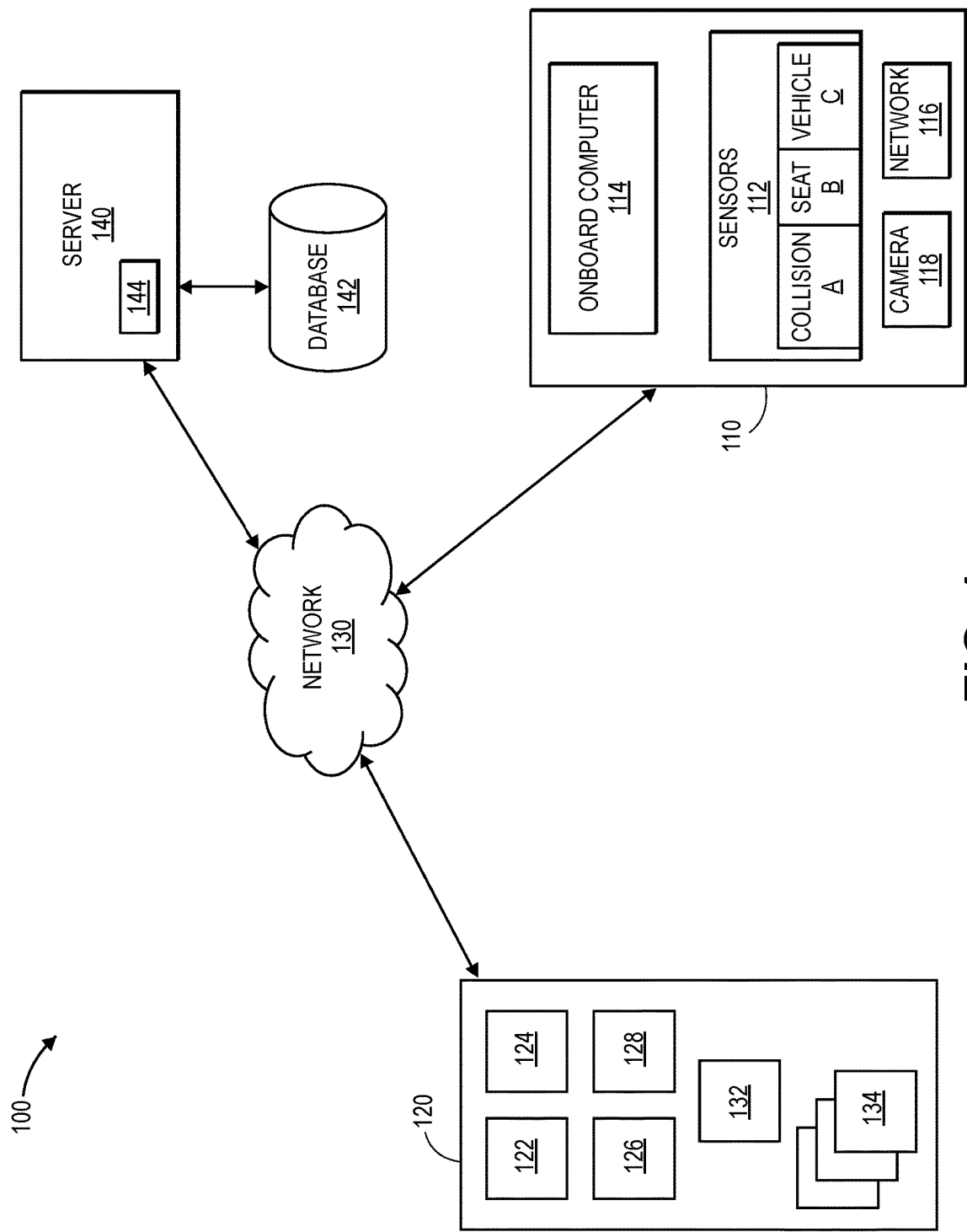
FIG. 1 depicts a block diagram of an exemplary computer system in which methods and systems for automated vehicle seat replacement are implemented.

FIG. 1 illustrates a block diagram of an exemplary automated vehicle seat replacement system (AVSRS) 100 in accordance with an exemplary aspect of the present disclosure. In some aspects, the AVSRS 100 may include hardware and software entities, applications, components, and devices configured to determine an indication of whether a vehicle seat requires replacement after a vehicle collision. It should be appreciated that additional, fewer, or alternate entities, applications, components, and devices may be implemented.

The AVSRS 100 may include a vehicle 110. As illustrated, the vehicle 110 may include one or more on-board computers 114. In one example, the on-board computer 114 may be a general-use on-board computer capable of performing one or more functions relating to vehicle operation or a dedicated computer for supporting an infotainment console. The on-board computer 114 may be installed by the manufacturer of the vehicle 110 or as an aftermarket modification and/or addition to the vehicle 110.

The on-board computer 114 may interface with the one or more sensors 112 within the vehicle 110. The sensors 112 may be coupled to the on-board computer 114 via a controller area network (CAN) bus, a telematics/diagnostics system bus, and/or other in-vehicle communication network. Generally, the sensors 112 include one or more collision sensors 112A providing data which may indicate whether the vehicle 110 was in a collision; one or more seat sensors 112B providing data which may indicate a condition of a vehicle seat; and/or one or more vehicle sensors 112C providing data which may indicate a condition of the vehicle 110.

The one or more sensors 112 of the vehicle 110 and/or other sensors of the AVSRS 100 may sense, operate, or otherwise receive input and/or data in any suitable manner. This may include operating in a continuous and/or intermittent (e.g., every 5 millisecond) fashion. This may also include collecting, storing and/or transmitting data. The data may be stored permanently or non-permanently in any suitable manner, such as on a local storage means, (e.g., RAM or a hard drive), or remotely on a server, in the cloud and/or another remote storage means. The one or more sensors 112 may collect, store and/or transmit data individually or collectively.

The one or more sensors 112 of the vehicle 110 and/or other sensors of the AVSRS 100 may communicate with one another in a wired, wireless or any other suitable manner. The communication may be continuous, intermittent, unidirectional, bidirectional or any other suitable means of communication. The one or more sensors 112 may act in concert, e.g., in creating a mesh network. The one or more sensors 112 may be local and/or remote sensors, and may communicate or otherwise interface with one or more local or remote processors, transceivers, servers and/or sensors for various purposes which may be unrelated to determining a replacement recommendation of a vehicle seat, such as for timing, updates, status reporting, or any other suitable purpose.

In one embodiment, one or more of the collision sensors 112A, seat sensors 112B and/or vehicle sensors 112C may be associated with vehicle and/or are non-vehicle systems, components and/or sensors, and may include one or more sensors of a CAN bus, a telematics system, an engine, a transmission, an airbag, a seat belt, a tire, a battery, a fuel tank, an oil reservoir, a microphone, a mobile device, a wearable, and/or an imaging device, to name but a few examples.

Types of collision sensors 112A may include one or more of (i) airbag sensors; (ii) cameras 118; (iii) collision/impact sensors; (iv) compass/directional sensors; (v) electrical/voltage/current sensors; (vi) force/torque sensors; (vii) fill/level sensors; (viii) GPS sensors; (ix) inertial sensors; (x) infrared (IR) sensors; (xi) LIDARs; (xii) microphones; (xiii) position/distance/angle sensors; (xiv) pressure sensors; (xv) RADARs; (xvi) speed/velocity/acceleration sensors; (xvii) temperature sensors; (xviii) tension sensors for a seat-belt; (xix) ultrasonic sensors, as well as any other suitable sensors.

Types of seat sensors 112B may include one or more of (i) cameras 118; (ii) infrared (IR) sensors; (iii) microphones, as well as any other suitable sensors.

Types of vehicle sensors 112C may include one or more: (i) airbag sensors; (ii) cameras 118; (iii) collision/impact sensors; (iv) electrical/voltage/current sensors; (v) force/torque sensors; (vi) fill/level sensors; (vii) inertial sensors; (viii) infrared (IR) sensors; (ix) microphones; (x) position/distance/angle sensors; (xii) pressure sensors; (xii) speed/velocity/acceleration sensors; (xiii) temperature sensors, as well as any other suitable sensors. It should be appreciated that in some embodiments, a particular sensor 112 may be included in any number of the collision sensors 112A, the seat sensors 112B, and/or the vehicle sensors 112C.

The vehicle 110 may further include a communication component 116 coupled to the on-board computer 114 and configured to transmit information to, and receive information from, external sources. In some embodiments, the communication component 116 may receive information from external sources, such as a sever 140. The communication component 116 may also send information regarding the vehicle 110 to external sources. To send and receive information, the communication component 116 may include a transmitter and a receiver designed to operate according to any suitable wired or wireless communication, standard or technology, such as GSM, CDMA, TDMA, WCDMA, LTE, EDGE, OFDM, GPRS, EV-DO, UWB, 3G, 4G, 5G, IEEE 802 including Ethernet, WiMAX, Wi-Fi, Bluetooth, and/or other suitable communication. In one example, the on-board computer 114 may transmit sensor data via the communication component 116 after detecting a collision.

The vehicle 110 may include one or more cameras 118 coupled to the on-board computer 114. The cameras 118 may include interior cameras (such as a camera disposed in a rearview mirror and having a field-of-view (FOV) directed towards the vehicle interior) and/or exterior cameras (such as a back-up camera or sideview mirror camera). The one or more cameras 118 may provide images of the interior and/or exterior of the vehicle 110, a vehicle seat associated with the vehicle, passengers and/or the vehicle environment. The one or more cameras 118 may include digital cameras or other similar devices, such as charge-coupled devices, to detect electromagnetic radiation in the visual range or other wavelengths.

The vehicle 110 may include additional, fewer, and/or alternate components, and may be configured to perform additional, fewer, or alternate actions, including components/actions described herein.

The AVSRS 100 may include one or more mobile devices 120, e.g., a mobile device traveling with the vehicle 110, which may include, e.g., smartphones, smart watches, tablets, laptops, virtual reality headsets, augmented reality glasses, wearables, etc. Although only one mobile device 120 is illustrated, it should be understood that a plurality of mobile devices 120 may be used in some embodiments. The mobile device 120 may include a memory 122, a processor (CPU) 124, a controller 124, a network interface 126, an I/O 128, a camera 132 and/or sensors 134.

The memory 122 may include one or more memories, such as a non-transitory, computer readable memory comprising computer-executable instructions that, when executed, cause the mobile device 120 to perform actions thereof described in this description (e.g., via the processor 124, controller 124, and/or other components of the mobile device 120). The memory 122 may comprise one or more memory modules such a random-access memory (RAM), read-only memory (ROM), flash memory, a hard disk drive (HDD), a solid-state drive (SSD), flash memory, MicroSD cards, and/or other types of suitable memory.

The memory 122 may store an operating system (OS) (e.g., iOS, Android, etc.) capable of facilitating the functionalities, applications, methods, or other software as described herein. The memory 122 may also store one or more applications, e.g., for collision detection, assessing potential passenger injury, and/or a vehicle seat replacement recommendation after a collision. Additionally, or alternatively, the memory 122 may store data from various sources, such as sensor data from the vehicle 110 and/or mobile device 120.

The processor 124 may include one or more local or remote processors, which may be of general-purpose or specific-purpose. In some aspects, this may include one or more microprocessors, ASICs, FPGAs, systems-on-chip (SoCs), systems-in-package (SiPs), graphics processing units (GPUs), as well as any other suitable types of processors. During operation, the processor 124 may execute instructions stored in memory 122 coupled to the processors 124 via a system bus of controller 124.

The mobile device 120 may further include a controller 124. The controller may receive, process, generate, transmit, and/or store data and may include and/or be operably connected to (e.g., via a system bus) the memory 122, the processor 124, and/or the I/O 128, as well as any other suitable components.

The mobile device 120 may further include a network interface 126, which may facilitate communications to and/or from the mobile device 120 with the vehicle 110, a server 140, one or more devices, systems and/or networks 140. The network interface 126 may include one or more transceivers and/or modems, and may facilitate any suitable wired or wireless communication, standard or technology, such as GSM, CDMA, TDMA, WCDMA, LTE, EDGE, OFDM, GPRS, EV-DO, UWB, 3G, 4G, 5G, IEEE 802 including Ethernet, WiMAX, Wi-Fi, Bluetooth, and/or other suitable communication.

The I/O 128 (i.e., one or more input and/or output units) may include, interface with and/or be operably connected to, in one example, one or more input and/or output devices, such as a display, touchpad, a touchscreen, a keyboard, a mouse, speaker, microphone, a haptic/vibration device, and/or other suitable input and/or output devices. Although FIG. 1 depicts the I/O 128 as a single block, the I/O 128 may include a number of different I/O circuits, busses and/or modules, which may be configured for I/O operations.

One or more cameras 132 of the mobile device 120 may capture still or video images of the physical environment of the mobile device 120, which may include the interior and/or exterior of the vehicle the mobile device 120 is traveling in, a passenger carrying the mobile device 120, etc. The one or more cameras 132 may include digital cameras or other similar devices, such as charge-coupled devices, to detect electromagnetic radiation in the visual range or other wavelengths.

The mobile device 120 may further include one or more sensors 134. In one example, the sensors 134 of the mobile device 120 may include one or more accelerometers, gyroscopes, inertial measurement units (IMUs), GPS units, proximity sensors, cameras 132, microphones, as well as any other suitable sensors. Any and/or all of the sensors 134 may generate sensor data to indicate one or more of a collision of the vehicle 110 in which the mobile device 120 may be located, the vehicle condition, the vehicle seat condition and/or the vehicle seat replacement recommendation.

The mobile device 120 may include a power source (not shown), such a rechargeable battery pack. The mobile device 120 may include additional, fewer, and/or alternate components, and may be configured to perform additional, fewer, or alternate actions, including components/actions described herein.

The AVSRS 100 may include a network 130 comprising one or more networks and facilitate any type of data communication via any standard or technology (e.g., 5G, 4G, 3G, GSM, CDMA, TDMA, LTE, EDGE, OFDM, GPRS, EV-DO, UWB, IEEE 802 including Ethernet, WiMAX, Wi-Fi, Bluetooth, and/or others). The network 130 may include a public network, such as the Internet or a cellular network, a private network such as an LAN, intranet or VPN, or any combination thereof.

As illustrated, the AVSRS 100 may also include one or more servers 140. Each server 140 may include one or more computer processors adapted and configured to execute various software applications and components described herein. The server 140 may further include a database 142, which may be adapted to store data related to the condition of the vehicle 110 (e.g., sensor data). The server 140 may access data stored in the database 142 when executing various functions and tasks associated with the evaluating the condition of the vehicle 110 after a collision, as well as other suitable functions and tasks.

The server 140 may further include one or more software applications stored in a program memory 144. The various software applications on the server 140 may include software for evaluating the condition of a vehicle and/or vehicle seat after a collision, among other things.

Although the AVSRS 100 is shown to include one vehicle 110, one mobile device 120, one on-board computer 114, and one server 140, it should be understood that different numbers of vehicles 110, mobile devices 120, on-board computers 114, and/or servers 140 may be utilized. In one example, the system 100 may include a plurality of servers 140 and hundreds or thousands of mobile devices 120 or on-board computers 114, all of which may be interconnected via the network 130. Furthermore, the database storage or processing performed by the one or more servers 140 may be distributed among a plurality of servers 140 in an arrangement known as "cloud computing." This configuration may provide various advantages, such as enabling near real-time uploads and downloads of information as well as periodic uploads and downloads of information.

The AVSRS 100 may include additional, fewer, and/or alternate components, and may be configured to perform additional, fewer, or alternate actions, including components/actions described herein. Although AVSRS 100 is shown in FIG. 1 as including one instance of various components such as vehicle 110, mobile device 120, server 140, etc., various aspects include AVSRS 100 implementing any suitable number of any of the components shown in FIG. 1 and/or omitting any suitable ones of the components shown in FIG. 1. For instance, information described as being stored at server database 152 may be stored at memory 122, and thus database 152 may be omitted. Moreover, various aspects include AVSRS 100 including any suitable additional component(s) not shown in FIG. 1, such as but not limited to the exemplary components described above. Furthermore, it should be appreciated that additional and/or alternative connections between components shown in FIG. 1 may be implemented. As just one example, server 140 and mobile device 120 may be connected via a direct communication link (not shown in FIG. 1) instead of, or in addition to, via network 130.

Exemplary Signal Diagram for Automated Vehicle Seat Replacement

Figure 2:
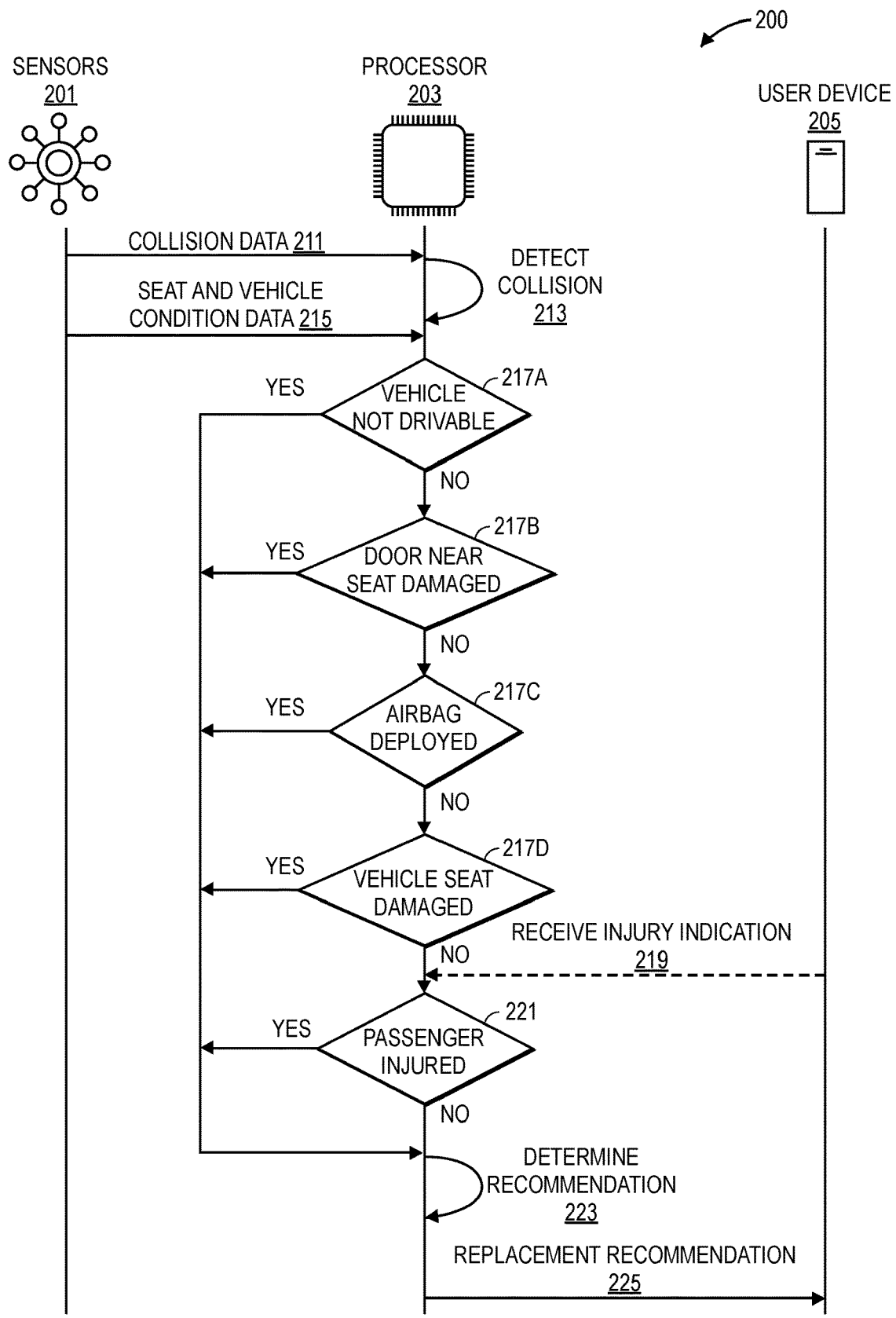
FIG. 2 illustrates an exemplary signal diagram in which a processor, such as one or more of the processors of FIG. 1, automatically evaluates sensor data, such as one or more of the sensors of FIG. 1, to determine the vehicle seat replacement recommendation.

FIG. 2 depicts an exemplary signal diagram 200 in which a processor 203, such as the processors of on-board computer 114, mobile device processor 124, or processor of server 140 of FIG. 1, recommends a vehicle seat replacement based upon data from one or more sensors 201, such as sensors 112, 134 of FIG. 1. The processor 203 may be communicatively coupled to a user device 205, such as the mobile device 120 or on-board computer 114 of FIG. 1, or any other user device.

The signal diagram may begin when the processor 203 obtains collision data 211 from the sensors 201. The sensors 201 may be associated with/part of a vehicle, a device within the vehicle, e.g., a mobile device, or any other suitable sensor. The collision data 211 may be transmitted to the processor 203 in a wired or wireless manner, as described herein.

The processor 203 may process the collision data 211 to detect a collision 213 of the associated vehicle. In one example, as a result of a collision, the vehicle may experience sudden impact forces, airbags may deploy, tires may deflate, the engine may stall, fluids (e.g., oil, fuel, washer fluid, radiator fluid/coolant, transmission fluid) may leak, glass (e.g., windows, mirrors, windshield) may break, damage to the vehicle exterior may cause lighting elements (e.g., turn-signals and headlamps) to become inoperable, body panels of the vehicle may be scratched, dented or otherwise visibly damaged, among other things. Sensors configured to detect forces related to an impact, airbags deploying, tire air pressure, engine malfunctions, fluid pressure/levels, sounds or images related to shattered glass, and/or electrical properties indicating lighting elements of turn-signals/headlamps are unable to illuminate may produce data indicative of these conditions. The processor 203 may obtain and analyze the data individually and/or collectively from one or more of these sensors to detect that a collision 213 has occurred.

Upon detecting a collision 213 has taken place, the processor 203 may obtain seat condition data and/or vehicle condition data 215 from the sensors 201. In one example the seat and/or vehicle condition data 215 may automatically be obtained by the processor 203 at a time proximate (e.g., before, during and/or after) the collision, and may include data such as images of the vehicle and/or vehicle seat before, during and or after the collision, e.g., confirming that a vehicle seat was in the vehicle before the collision occurred. In one example, one or more passengers may be involved in providing the data 215, e.g., upon detecting a collision has taken place, a mobile device application ("app") of a user device 205 may automatically activate and request the user take images of the vehicle to analyze the condition of the vehicle. The techniques of the present invention may include any suitable manner of obtaining seat condition data and/or vehicle condition data 215 by the processor 203.

Once obtained, the processor 203 may analyze the seat condition data and/or vehicle condition data 215 to determine one or more collision conditions, which may include but are not limited to, collision conditions indicating that (i) the vehicle is not drivable 217A, (ii) a vehicle door proximate the vehicle seat is damaged 217B, (iii) an airbag of the vehicle is deployed 217C, and/or (iv) the vehicle seat is visibly damaged 217D. If the processor 203 detects one or more of the four specific collisions conditions 217A, 217B, 217C, 217D exist, the processor 203 determines a vehicle seat replacement recommendation 223 and provides the recommendation 225 to a user device 205 to replace the vehicle seat.

Continuing with the example of the collision described above, after the collision the vehicle engine may stall and/or fail to restart for one or more reasons, e.g., loss of oil pressure from a crack in the blockhead, an electronic ignition controller malfunctioning, or other suitable engine damage. Data from sensors 201 associated with engine systems and/or components may be provided to the vehicle on-board computer, e.g., to illuminate an engine icon on the dashboard indicating engine malfunctioning. Additionally, tire pressure sensors may also provide sensor data to the on-board computer indicating that two tires have lost pressure and become "flat" as a result of the collision. In one example, data from one or more sensors 201 which may indicate mobility of the vehicle may be analyzed by the processor 203, e.g., sensor data from components, devices and/or systems such as the battery, brakes, on-board diagnostics (OBD), pumps, transmission, as well as any other suitable systems and/or components. Based upon analyzing the sensor data, the processor 203 may detect the vehicle is not drivable 217A, thereby determining one of the vehicle collision conditions exists.

The processor 203 may subsequently determine the recommendation 223 to replace the vehicle seat and provide the recommendation 225 to the user device 205 based upon the collision condition that the vehicle is not drivable 217A. In one example, the recommendation 225 may be one or more of a phone call, email, text message, voice prompt, sound, notification (e.g., via the mobile app), alert and/or other electronic notification to the user device 205, which may include a mobile device of the driver/passenger in the vehicle, the vehicle on-board computer and/or other suitable user device.

In addition to recommending 225 the seat be replaced, determining the recommendation 223 may include additional information, e.g., a recommendation of one or more specific brands and/or models of seats as a replacement including those which may be recommended based upon a specific model of vehicle, age of the seat occupant, or other relevant factors, information on how/where to purchase a replacement seat, and/or other information.

In one example when the processor 203 does not detect the vehicle is not drivable 217A, the processor 203 may similarly analyze the seat condition data and/or vehicle condition data 215 from the sensors 201 to detect the collision condition indicating the door near the vehicle seat is damaged 217B. In one example, one or cameras associated with the vehicle (e.g., a rearview mirror camera, camera of a mobile device of a passenger of the vehicle) may provide image data to the processor 203 which may be analyzed to determine the door near the vehicle seat is damaged 217B. This may include images indicating the location of the vehicle seat in the vehicle and the condition of the door proximate the vehicle seat. The images may depict the door proximate the vehicle seat as having dented or damaged exterior panels, shattered glass, broken interior components, among other things as a result of the collision. In one example, the processor 203 may use image data analysis to determine door damage, such as machine vision, computer vision, object recognition, machine learning, artificial intelligence, or any other suitable image data analysis techniques. Once the processor 203 detects the door near the vehicle seat has been damaged 217B from the seat condition data and/or vehicle condition data 215, the processor 203 may determine the vehicle seat recommendation 223 and provide the recommendation 225 of vehicle seat replacement to the user device 205 as previously discussed.

In one example when the processor 203 does not detect the door near the vehicle seat is damaged 217B, the processor 203 may analyze the seat condition data and/or vehicle condition data 215 from the sensors 201 to detect the collision condition indicating the airbag of the vehicle is deployed 217C. In one example, data from sensors to detect one or more deployed airbags may include cameras of devices previously discussed providing interior vehicle image data to detect one or more deployed airbags using the aforementioned image data analysis techniques, airbag sensors which may indicate an airbag is deployed, as well as any other suitable sensor data. Once the processor 203 detects the airbag of the vehicle is deployed 217C from the seat condition data and/or vehicle condition data 215, the processor 203 may determine the vehicle seat recommendation 223 and provide the recommendation 225 of vehicle seat replacement to the user device 205 as previously discussed.

In one example when the processor 203 does not detect the airbag of the vehicle is deployed 217C, the processor 203 may analyze the seat condition data and/or vehicle condition data 215 from the sensors 201 to detect the collision condition indicating the vehicle seat is visibly damaged 217D. Data from sensors which may be analyzed may include components, devices and systems such as cameras. In one example, analyzing image data of the vehicle seat collected by cameras of devices previously discussed may indicate damage to the vehicle seat, e.g., cracks, broken and/or damaged components. In one example, the processor 203 may compare before and after images of the vehicle seat to detect if it has moved within the vehicle due to the collision, which may indicate damage to the vehicle seat, as well as the aforementioned image data analysis techniques. Once the processor 203 detects the vehicle seat is visibly damaged 217D from the seat condition data and/or vehicle condition data 215, the processor 203 may determine the vehicle seat recommendation 223 and provide the recommendation 225 of vehicle seat replacement to the user device 205 as previously discussed.

If the processor 203 does not detect any of the four specific collision conditions 217A, 217B, 217C, 217D, it may next determine whether other collision conditions may indicate that the passenger may be injured 221. In one example, the processor 203 of the vehicle on-board computer via a user interface may prompt a passenger to indicate whether any passengers have been injured in the collision. In one example, the collision may trigger an app on the mobile device of a passenger to request a "yes" or "no" voice response regarding whether a passenger was injured, and/or other suitable methods of receiving an indication 219 from a user device 205 regarding whether the passenger was injured in the collision.

In one example, the seat condition data and/or vehicle condition data 215 (e.g., data indicating impact forces, the quantity/quality of damage to the vehicle, etc.) may be analyzed to indicate the severity of the crash. The data analysis may include a machine learning model trained to associate the seat condition data and/or vehicle condition data 215 with passenger injury, and the processor 203 may determine the collision conditions indicate that the passenger may be injured 221 from the collision. In one aspect, the vehicle being involved in any collision may warrant a determination that the passenger may be injured 221.

Based upon the indication 221 of whether a passenger is injured from the collision, the processor 203 may determine a recommendation 223 whether the user should replace the vehicle seat, or if replacement is not suggested. If the received injury indication 219 indicates 221 that a passenger is not injured from the collision, the processor 203 may determine a recommendation 223 that the vehicle seat does not need to be replaced. However, if the indication 221 is that the passenger is injured, the processor 203 may determine a recommendation 223 to replace the vehicle seat. Once determined 223, the processor 203 may provide the replacement recommendation 225 to the user device 205 as previously discussed.

Although the signal diagram of FIG. 2 depicts and/or describes an exemplary order of events and/or signals, other embodiments may include more, less, and/or an alternate sequence of one or more signals and/or events.

Exemplary Computer System for Automated Vehicle Seat Replacement

Figure 3A:
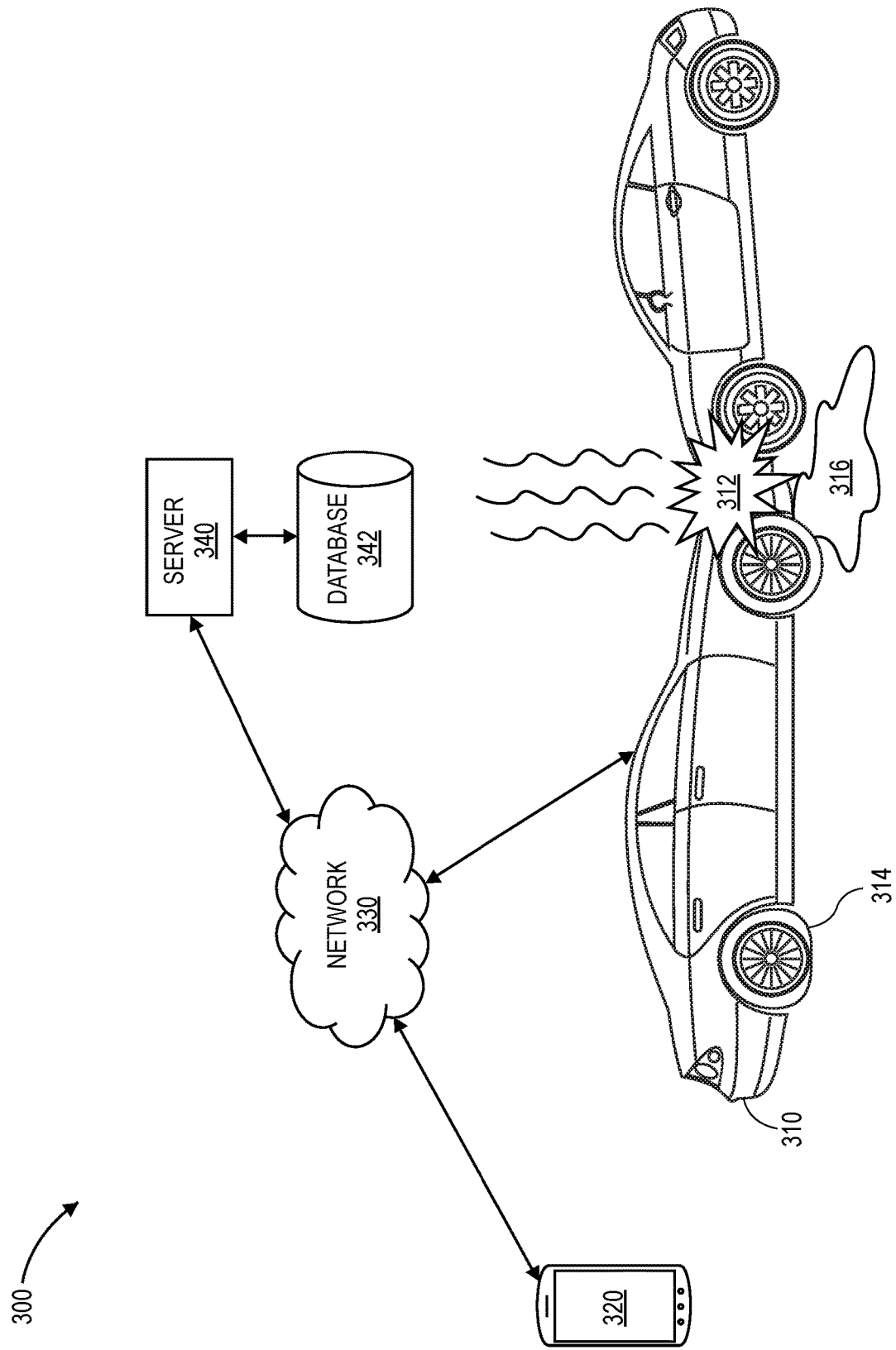
FIG. 3A illustrates an exemplary computer system for automated vehicle seat replacement including an exterior vehicle view.

FIG. 3A depicts an exemplary computer system 300 for automatically evaluating a vehicle seat replacement after a vehicle collision 312 in which the techniques described herein may be implemented, according to embodiments. The system 300 may include a vehicle 310, a mobile device 320 such as the mobile device 120 of FIG. 1, a network 330 such as the network 130 of FIG. 1, a server 340 such as the server 140 of FIG. 1, and a database 342 such as the database 142 of FIG. 1. The system may include additional, less, or alternate devices, including those discussed elsewhere herein.

The system 300 via server 340 may obtain sensor data over network 330 from one or more collision sensors indicating that the vehicle 310 associated with the vehicle seat 364 was involved in the vehicle collision 312, resulting in a flat tire 314 and fluid leak 316.

In some aspects, one or more collision sensors associated with aforementioned systems and/or components of the vehicle 310 may generate data which, when analyzed by server 340, indicates the collision 312 has occurred. In one example, a vehicle imaging device such as a rearview mirror, sideview mirror and/or back-up camera may capture images of interior and/or exterior damage to the vehicle 310. The image data may be processed by the server 340 using a computer vision program stored on database 342 to detect the collision 312. In one example, the mobile device 320 within the vehicle 310 may detect a sudden impact using data from gyroscopes and/or accelerometers, as well as other sensors, to detect the collision 312. In another example, data from vehicle and non-vehicle sensors may collectively indicate the collision 312, e.g., the GPS data of the mobile device 320 inside vehicle 310 may indicate a sudden stop in movement. The vehicle on-board computer may receive image data of a fast-approaching vehicle from the backup camera. The combined GPS and camera sensor data may be processed by the server 340, e.g., using a machine learning model trained to detect a collision 312 based upon sensor data, and may detect a collision 312.

Once the collision 312 is detected, the server 340 may obtain vehicle seat condition data from one or more sensors associated with the vehicle seat (seat sensors) indicating a vehicle seat condition and may also obtain vehicle condition data from one or more sensors associated with the vehicle 310 (vehicle sensors) indicating a vehicle condition, as previously described.

In one example, the vehicle seat condition data may include a visual indication of cracking, warping, diminished structural integrity, and/or movement of the vehicle seat due to the collision 312, e.g., using aforementioned image analysis techniques on image data of the vehicle seat.

In one example, the vehicle condition data may indicate one or more of: (i) a vehicle exterior condition such as damage, dents, scratches, leaks 316, cracks, breaks of exterior systems, components, and/or parts of the vehicle 310 such as body panels, bumpers, the windshield, mirrors, lights, tires, wheels, windows, etc.; (ii) a vehicle interior condition such as damage, cracks, breaks, inoperative and/or malfunctioning of interior systems, components, and/or parts of the vehicle 310 such as doors, seats, airbags, seat belts, the dashboard, etc.; (iii) a vehicle mobility condition such as the inability to start, drive and/or move the vehicle 310 related to systems, components, and/or parts of the vehicle 310 such as the engine, transmission, wheels, tires etc., and/or (iv) a vehicle electromechanical condition such as malfunctioning and/or inoperable mechanical, electrical and/or electromechanical systems, components, and/or parts of the vehicle 310 such as the on-board computer, controllers, wiring, motors, actuators, locks, etc.

The server 340 may obtain (e.g., via network 330) and analyze one or more of the vehicle seat condition data and/or the vehicle condition data to detect one or more collision conditions, the one or more collision conditions indicating that (i) the vehicle is not drivable, (ii) a vehicle door proximate the vehicle seat is damaged, (iii) an airbag of the vehicle is deployed, and/or (iv) the vehicle seat is visibly damaged. In response to detecting one or more collision conditions, the server 340 may generate a recommendation to replace the vehicle seat and provide the recommendation to replace the vehicle seat to the user device, such as mobile device 320 or the vehicle on-board computer.

In one example, one or more collision conditions may be detected when the CAN bus detects multiple systems and/or sensors are suddenly malfunctioning; battery sensors of an electrical vehicle detect battery pack leaks, temperature increases and/or abnormal electrical characteristics; tire sensors may report to the vehicle on-board computer that a tire has gone flat 314; fuel, radiator and/or oil-related fluids levels and/or pressures may rapidly decrease indicating one or more cracks and/or leaks 316; a mobile device 320 microphone inside the vehicle 310 may detect forces and sounds associated with a collision 312, such as airbags deploying. Any suitable sensor data may be transmitted to and/or obtained by the server 340 for analysis to determine the one or more collision conditions.

Figure 3B:
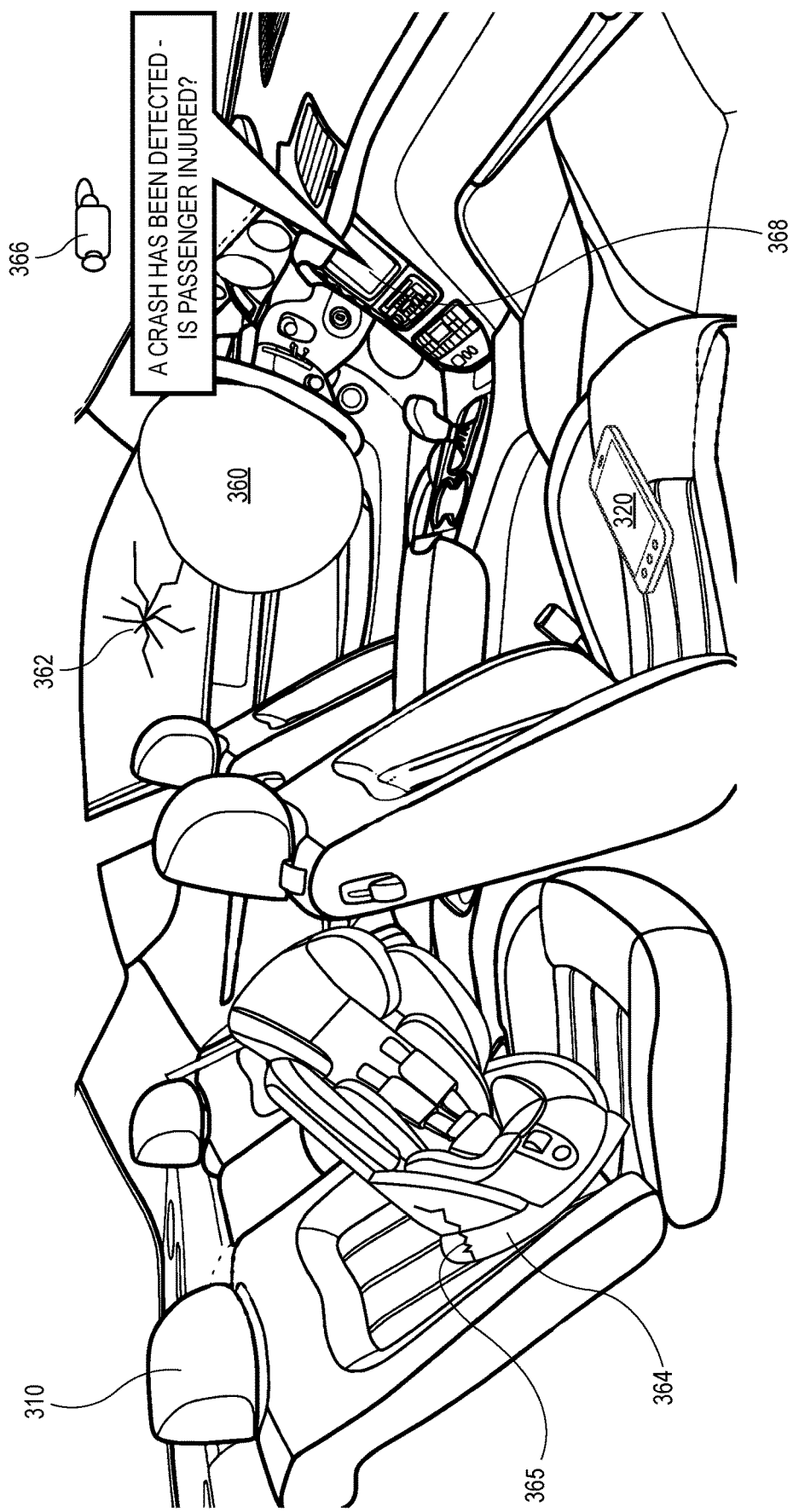
FIG. 3B illustrates an exemplary computer system for automated vehicle seat replacement including an interior vehicle view.

In some embodiments according to FIG. 3B depicting an interior view 350 of the vehicle 310 after the collision 312, airbag 360 is deployed, driver side window has visible cracks 362 and vehicle seat 364 has been turned on its side. The rearview mirror camera 366 may collect image data of the aforementioned damage, transmit the data to the server 340 via network 330, e.g., using the on-board computer 368. An airbag sensor may generate data indicating the airbag is deployed 360 and likewise transmit the data to the server 340 via the on-board computer 368. The server 340 may determine one or more collision conditions based upon analyzing the vehicle seat condition data, e.g., image data of the vehicle seat provided by camera 336 and/or vehicle condition data e.g., image data of the window cracks 362 and deployed airbag 360, as well as airbag sensor data.

In one example, data analysis may be required for the server 340 to detect one or more collision conditions, e.g., camera image data of the vehicle seat 364 may be processed using machine learning, computer vision and/or machine vision or other aforementioned techniques to detect visible damage to the vehicle seat 364. In one example, vehicle sensor data may indicate the locks on the left passenger door behind the driver's seat are inoperable and camera image data may indicate the vehicle seat 364 is next to the left passenger door, which also has a shattered window. The sensor data may be processed using one or more machine leaning models stored in database 342 on server 340 to detect damage to the vehicle door proximate the vehicle seat 364. Accordingly, any suitable manner of analyzing vehicle seat condition data and/or vehicle condition data may be implemented by the system 300 to detect collision conditions, including but not limited to, operating systems, applications, voice or chat bots, ChatGPT bots, algorithms, object recognition, machine vision, computer vison, artificial intelligence, machine learning model, neural networks, deep learning, quantum computing, to name but a few.

In one example, the server 340 may detect the vehicle 310 is not drivable based upon one or more of the vehicle seat condition data and/or the vehicle condition data indicating (i) the tire is deflated 314; (ii) the CAN bus is malfunctioning; (iii) the engine is malfunctioning; (iv) the transmission is malfunctioning; (v) the airbag is deployed 360; (vi) a fluid leak 316 is detected; (vii) non-minor exterior damage, such as an unlatched hood and shattered windshield; and/or (viii) non-minor interior damage, such as a steering column being broken, as well as any other suitable sensor data indicating the vehicle 310 is not drivable.

In one example, the server 340 may detect the vehicle door proximate the vehicle seat 364 is damaged based upon one or more of the vehicle seat condition data and/or the vehicle condition data indicating (i) visual damage to the door proximate the vehicle seat 364, e.g., via analysis of image data of the doors; and/or (ii) an impact associated with the door proximate the vehicle seat 364, which may also include analyzing image and/or other sensor data. In one example, the vehicle interior camera 366 may provide image data to the server 340 indicating the location of the vehicle seat 364 and that a side airbag proximate the vehicle seat 364 is deployed. An exterior vehicle camera, such as a sideview mirror camera, may provide image data indicating exterior damage to the panel of the door proximate the vehicle seat 364. The server 340 may process any and/or all the sensor data to determine the vehicle seat 364 is damaged.

In one example, the server 340 may detect a deployed airbag 360 of the vehicle 310 based upon one or more of the vehicle seat condition data and/or the vehicle condition data indicating (i) a visual indication an airbag is deployed 360 (e.g., via camera image data of the vehicle interior); and/or (ii) an electronic indication an airbag is deployed 360 (e.g., via an airbag sensor data which may be relayed to the on-board computer 368 and subsequently transmitted to the server 340).

In one example, the sever 340 may detect the vehicle seat 368 is visibly damaged based upon one or more of the vehicle seat condition data and/or the vehicle condition data visually indicating the vehicle seat 368 is damaged. This may include a camera 366 inside the vehicle collecting image data before and after the collision 312, which when obtained and processed by the server 340, indicates the vehicle seat 364 has been turned on its side, as depicted in FIG. 3B, and may include other visual indications of damage such as broken latching components and/or a crack 365 in the vehicle seat 364. In one example, an exterior vehicle camera may collect image data which when processed by the server 340 indicates the vehicle seat 364 was thrown outside the vehicle 310, indicating damage to the vehicle seat 364.

Upon detecting one or more collision conditions indicating that (i) the vehicle 310 is not drivable, (ii) a vehicle door proximate the vehicle seat 368 is damaged, (iii) an airbag of the vehicle is deployed 360, and/or (iv) the vehicle seat 368 is visibly damaged, the server 340 may provide a recommendation to replace the vehicle seat 368 to a user device, such as mobile device 320, on-board computer 368, or any suitable user device.

In certain embodiments, collision conditions may indicate a passenger of the vehicle is injured from the vehicle collision 312 and may cause the server 340 to obtain from the user device an indication whether the passenger of the vehicle 310 is injured from the vehicle collision 312. As described herein, obtaining the injury indication may include a phone call, email, text, voice prompt, and/or other notification e.g., via the on-board computer 368, mobile device 320 and/or other suitable user device.

In one example, the server 340 may have information stored in the database 342 associated with the vehicle 310 and/or the passengers therein, such as contact information. Additionally or alternatively, once a collision 312 is detected by the server 340 via sensor data obtained from the on-board computer 368 and/or a mobile device 320, the server 340 may retrieve the passenger contact information including a phone number from the database 342 and send an electronic message (e.g., text message) via network 330 to the phone number requesting the injury indication. Upon receiving an indication that the passenger of the vehicle 310 is injured from the vehicle collision 312, the server 340 may provide a vehicle seat replacement recommendation.

In certain embodiments, providing the recommendation to replace the vehicle seat 368 may include providing a list of one or more replacement vehicle seats to a user device, receiving from the user device an indication of a replacement vehicle seat, and providing to the user device one or more options to purchase the replacement vehicle seat, such as hyperlinks to one or more vendors websites from which the user may purchase a new vehicle seat.

The system 300 may include additional, fewer, and/or alternate components, and may be configured to perform additional, fewer, or alternate actions, including components/actions described herein. Although the system 300 as shown in FIGS. 3A and 3B includes one instance of various components such as the vehicle 310, the mobile device 320, the server 340, etc., various aspects include the system 300 implementing any suitable number of any of the components shown in FIGS. 3A and 3B and/or omitting any suitable ones of the components shown in FIGS. 3A and 3B. For instance, the server 340 may be described as storing, processing and/or analyzing sensor data, although other components may be configured to provide this functionality, such as the mobile device 320 and/or the on-board computer 368, and thus the server 340 may be omitted.

Moreover, various aspects include the system 300 including any suitable additional component(s) not shown in FIGS. 3A and 3B, such as but not limited to the exemplary components described above. Furthermore, it should be appreciated that additional and/or alternative connections between components shown in FIGS. 3A and 3B may be implemented. As just one example, server 340 and mobile device 320 and/or on-board computer 368 may be connected via a direct communication link (not shown in FIG. 3A or 3B) instead of, or in addition to, via network 330.

Exemplary Computer-Implemented Method for Automated Vehicle Seat Replacement

Figure 4:
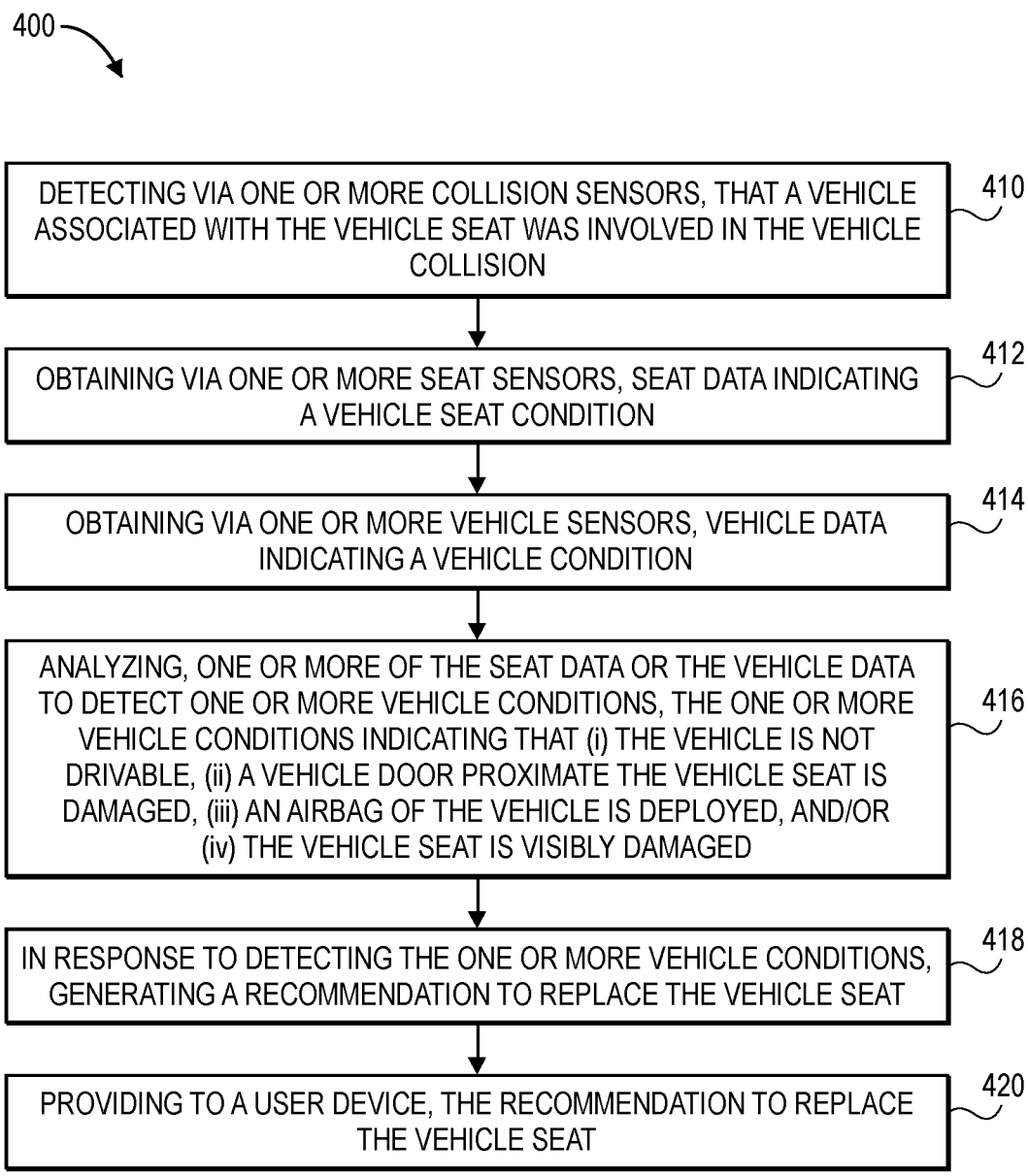
FIG. 4 illustrates a flow diagram of an exemplary computer-implemented method for automated vehicle seat replacement.

FIG. 4 depicts an exemplary flow diagram of an exemplary computer-implemented method 400 for automatically evaluating a vehicle seat replacement after a vehicle collision, according to one embodiment. One or more steps of the method 400 may be implemented as a set of instructions stored on a computer-readable memory and executable on one or more processors. The method 400 may be implemented via the AVSRS 100 of FIG. 1. The method may include additional, less, or alternate actions, including those discussed elsewhere herein.

The computer-implemented method 400 for automatically evaluating a vehicle seat replacement after a vehicle collision may include (1) at block 410 detecting, via one or more collision sensors, that a vehicle associated with the vehicle seat was involved in the vehicle collision; (2) at block 412 obtaining, via one or more seat sensors, vehicle seat condition data indicating a vehicle seat condition; (3) at block 414 obtaining, via one or more vehicle sensors, vehicle condition data indicating a vehicle condition; (4) at block 416 analyzing, one or more of the vehicle seat condition data or the vehicle condition data to detect one or more collision conditions, the one or more collision conditions may indicate that (i) the vehicle is not drivable, (ii) a vehicle door proximate the vehicle seat is damaged, (iii) an airbag of the vehicle is deployed, and/or (iv) the vehicle seat is visibly damaged; (5) at block 418 in response to detecting the one or more collision conditions, generating, a recommendation to replace the vehicle seat; and/or (6) at block 420 providing, to a user device, the recommendation to replace the vehicle seat.

The one or more collision conditions of method 400 may indicate that a passenger of the vehicle is injured from the vehicle collision. The method 400 may further include receiving, from the user device, an indication that the passenger of the vehicle is injured from the vehicle collision.

One or more of the collision sensors, seat sensors and/or vehicle sensors of method 400 may be associated with one or more of a CAN bus, a telematics system, an engine, a transmission, the airbag, a seat belt, a tire, a battery, a fuel tank, an oil reservoir, a microphone, a mobile device, a wearable, and/or an imaging device.

The vehicle seat condition data of method 400 may include a visual indication of cracking, warping, structural integrity, and/or movement of the vehicle seat.

The vehicle condition data of method 400 may indicate one or more of a vehicle exterior condition, a vehicle interior condition, a vehicle mobility condition, and/or a vehicle electromechanical condition.

Detecting the vehicle is not drivable at block 416 may include determining, based upon one or more of the vehicle seat condition data and/or the vehicle condition data, an indication of one or more of: (i) the tire is deflated; (ii) the CAN bus is malfunctioning; (iii) the engine is malfunctioning; (iv) the transmission is malfunctioning; (v) the airbag is deployed; (vi) a fuel leak is detected; (vii) an oil leak is detected; (viii) non-minor exterior damage; and/or (ix) non-minor interior damage.

Detecting the vehicle door proximate the vehicle seat is damaged at block 416 may include determining, based upon one or more of the vehicle seat condition data and/or the vehicle condition data, one or more of: (i) a visual indication of damage to the door proximate the vehicle seat; and/or (ii) an indication of an impact associated with the door proximate the vehicle seat.

Detecting an airbag of the vehicle is deployed at block 416 may include determining, based upon one or more of the vehicle seat condition data and/or the vehicle condition data, one or more of: (i) a visual indication an airbag is deployed; and/or (ii) an electronic indication an airbag is deployed.

Detecting the vehicle seat is visibly damaged at block 416 may include determining, based upon one or more of the vehicle seat condition data and/or the vehicle condition data, a visual indication the vehicle seat is damaged.

Providing the recommendation to replace the vehicle seat at block 420 may include providing, to the user device, a list of one or more replacement vehicle seats; receiving, from the user device, an indication of a replacement vehicle seat; and/or providing, to the user device, one or more options to purchase the replacement vehicle seat.

It should be understood that not all blocks of the exemplary flow diagram 400 are required to be performed. Moreover, the exemplary flow diagram 400 is not mutually exclusive (e.g., block(s) from exemplary example flowchart 400 may be performed in any particular implementation).

Additional Considerations

As used herein, the term "indicia" means both singular and plural. For example, the phrase "property inspection indicia" may mean either of a single property inspection indicium (e.g., a single leaking pipe) or multiple property inspection indicia (e.g., multiple leaking pipes, or a single leaking pipe and a building code violation, etc.).

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § (f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

In certain aspects, the systems and methods may apply machine learning and may store and/or execute one or more applications for machine learning, which may include storing historical data used to train the machine learning model, as well as the trained machine learning model itself.

The machine learning model may be trained by a machine learning model training application using training data corresponding to historical data. The trained machine learning model may then be applied to data in order to determine one or more aspects relevant to recommending a vehicle seat replacement.

In various aspects, the machine learning model may comprise a machine learning program or algorithm that may be trained by and/or employ a neural network, which may be a deep learning neural network, or a combined learning module or program that learns in one or more features or feature datasets in particular area(s) of interest. The machine learning programs or algorithms may also include natural language processing, semantic analysis, automatic reasoning, regression analysis, support vector machine (SVM) analysis, decision tree analysis, random forest analysis, K-Nearest neighbor analysis, naïve Bayes analysis, clustering, reinforcement learning, and/or other machine learning algorithms and/or techniques.

In some embodiments, the artificial intelligence and/or machine learning based algorithms used to train the machine learning model may comprise a library or package executed on the AVSRS 100 (or other user device(s) not shown in FIG. 1). For example, such libraries may include the TENSORFLOW based library, the PYTORCH library, and/or the SCIKIT-LEARN Python library.

Machine learning may involve identifying and recognizing patterns in existing historical data in order to facilitate making predictions or identification for subsequent data. Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server 140, user device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, user device, or otherwise processor(s), to predict, based upon the discovered rules, relationships, or model, an expected output.

In unsupervised machine learning, a server, user device, or otherwise processor(s), may be required to find structure in unlabeled example inputs, where, for example multiple training iterations are executed by the server, user device, or otherwise processor(s), to train multiple generations of models until a satisfactory model, e.g., a model that provides sufficient prediction accuracy when given test level or production level data or inputs, is generated. The disclosures herein may use one or both of such supervised or unsupervised machine learning techniques.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § (f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for automatically evaluating a vehicle seat replacement after a vehicle collision, comprising:

detecting, by one or more processors and via one or more collision sensors, that a vehicle associated with the vehicle seat was involved in the vehicle collision;

obtaining, by the one or more processors and via one or more seat sensors, vehicle seat condition data indicating a vehicle seat condition;

obtaining, by the one or more processors and via one or more vehicle sensors, vehicle condition data indicating a vehicle condition;

analyzing, by the one or more processors, one or more of the vehicle seat condition data and/or the vehicle condition data to detect one or more collision conditions, the one or more collision conditions indicating that (i) the vehicle is not drivable, (ii) a vehicle door proximate the vehicle seat is damaged, (iii) an airbag of the vehicle is deployed, and/or (iv) the vehicle seat is visibly damaged;

in response to detecting the one or more collision conditions, generating, by the one or more processors, a recommendation to replace the vehicle seat; and providing, by the one or more processors and to a user device, the recommendation to replace the vehicle seat.

2. The computer implemented method of claim 1, wherein:

the one or more collision conditions indicate that a passenger of the vehicle is injured from the vehicle collision; and the method further comprises:

receiving, from the user device, an indication that the passenger of the vehicle is injured from the vehicle collision.

3. The computer-implemented method of claim 1, wherein one or more of the collision sensors, seat sensors and/or vehicle sensors are associated with one or more of a CAN bus, a telematics system, an engine, a transmission, the airbag, a seat belt, a tire, a battery, a fuel tank, an oil reservoir, a microphone, a mobile device, a wearable, and/or an imaging device.

4. The computer-implemented method of claim 1, wherein the vehicle seat condition data includes a visual indication of cracking, warping, structural integrity, and/or movement of the vehicle seat.

5. The computer-implemented method of claim 1, wherein the vehicle condition data indicates one or more of a vehicle exterior condition, a vehicle interior condition, a vehicle mobility condition, a vehicle electromechanical condition.

6. The computer-implemented method of claim 1, wherein detecting the vehicle is not drivable comprises determining, by the one or more processors based upon one or more of the vehicle seat condition data and/or the vehicle condition data, an indication of one or more of (i) the tire is deflated; (ii) the CAN bus is malfunctioning; (iii) the engine is malfunctioning; (iv) the transmission is malfunctioning; (v) the airbag is deployed; (vi) a fuel leak is detected; (vii) an oil leak is detected; (viii) non-minor exterior damage; and/or (ix) non-minor interior damage.

7. The computer-implemented method of claim 1, wherein detecting the vehicle door proximate the vehicle seat is damaged comprises determining, by the one or more processors based upon one or more of the vehicle seat condition data and/or the vehicle condition data, one or more of (i) a visual indication of damage to the door proximate the vehicle seat; and/or (ii) an indication of an impact associated with the door proximate the vehicle seat.

8. The computer-implemented method of claim 1, wherein detecting an airbag of the vehicle is deployed comprises determining, by the one or more processors based upon one or more of the vehicle seat condition data and/or the vehicle condition data, one or more of (i) a visual indication an airbag is deployed; and/or (ii) an electronic indication an airbag is deployed.

9. The computer-implemented method of claim 1, wherein detecting the vehicle seat is visibly damaged comprises determining, by the one or more processors based upon one or more of the vehicle seat condition data and/or the vehicle condition data, a visual indication the vehicle seat is damaged.

10. The computer-implemented method of claim 1, wherein providing the recommendation to replace the vehicle seat further comprises:

providing, by the one or more processors to the user device, a list of one or more replacement vehicle seats;

receiving, by the one or more processor from the user device, an indication of a replacement vehicle seat; and providing, by the one or more processors to the user device, one or more options to purchase the replacement vehicle seat.

11. A computer system for automatically evaluating a vehicle seat replacement after a vehicle collision, comprising:

one or more processors; and one or more non-transitory memories storing processor-executable instructions that, when executed by the one or more processors, cause the system to:

detect via one or more collision sensors, that a vehicle associated with the vehicle seat was involved in the vehicle collision;

obtain via one or more seat sensors, vehicle seat condition data indicating a vehicle seat condition;

obtain via one or more vehicle sensors, vehicle condition data indicating a vehicle condition;

analyze one or more of the vehicle seat condition data and/or the vehicle condition data to detect one or more collision conditions, the one or more collision conditions indicating that (i) the vehicle is not drivable, (ii) a vehicle door proximate the vehicle seat is damaged, (iii) an airbag of the vehicle is deployed, and/or (iv) the vehicle seat is visibly damaged;

in response to detecting the one or more collision conditions, generate a recommendation to replace the vehicle seat; and provide to a user device, the recommendation to replace the vehicle seat.

12. The system of claim 11, wherein:

the one or more collision conditions indicate detecting that a passenger of the vehicle is injured from the vehicle collision; and further comprising instructions that, when executed, cause the system to:

receive, from the user device, an indication that the passenger of the vehicle is injured from the vehicle collision.

13. The system of claim 11, wherein one or more of the collision sensors, seat sensors and/or vehicle sensors are associated with one or more of a CAN bus, a telematics system, an engine, a transmission, the airbag, a seat belt, a tire, a battery, a fuel tank, an oil reservoir, a microphone, a mobile device, a wearable, and/or an imaging device.

14. The system of claim 11, wherein the vehicle seat condition data includes a visual indication of cracking, warping, structural integrity, and/or movement of the vehicle seat.

15. The system of claim 11, wherein the vehicle condition data indicates one or more of a vehicle exterior condition, a vehicle interior condition, a vehicle mobility condition, and/or a vehicle electromechanical condition.

16. The system of claim 11, wherein to detect the vehicle is not drivable further comprises instructions that, when executed, cause the system to determine, based upon one or more of the vehicle seat condition data and/or the vehicle condition data, an indication of one or more of (i) the tire is deflated; (ii) the CAN bus is malfunctioning; (iii) the engine is malfunctioning; (iv) the transmission is malfunctioning; (v) the airbag is deployed; (vi) a fuel leak is detected; (vii) an oil leak is detected; (viii) non-minor exterior damage; and/or (ix) non-minor interior damage.

17. The system of claim 11, wherein to detect the vehicle door proximate the vehicle seat is damaged further comprises instructions that, when executed, cause the system to determine, based upon one or more of the vehicle seat condition data and/or the vehicle condition data, one or more of (i) a visual indication of damage to the door proximate the vehicle seat; and/or (ii) an indication of an impact associated with the door proximate the vehicle seat.

18. The system of claim 11, wherein to detect an airbag of the vehicle is deployed further comprises instructions that, when executed, cause the system to determine, based upon one or more of the vehicle seat condition data and/or the vehicle condition data, one or more of (i) a visual indication an airbag is deployed; and/or (ii) an electronic indication an airbag is deployed.

19. The system of claim 11, wherein to detect the vehicle seat is visibly damaged further comprises instructions that, when executed, cause the system to determine, based upon one or more of the vehicle seat condition data and/or the vehicle condition data, a visual indication the vehicle seat is damaged.

20. A non-transitory computer-readable medium storing processor-executable instructions that, when executed by one or more processors, cause the one or more processors to:

detect via one or more collision sensors, that a vehicle associated with the vehicle seat was involved in the vehicle collision;

obtain via one or more seat sensors, vehicle seat condition data indicating a vehicle seat condition;

obtain via one or more vehicle sensors, vehicle condition data indicating a vehicle condition;

analyze one or more of the vehicle seat condition data and/or the vehicle condition data to detect one or more collision conditions, the one or more collision conditions indicating that (i) the vehicle is not drivable, (ii) a vehicle door proximate the vehicle seat is damaged, (iii) an airbag of the vehicle is deployed, and/or (iv) the vehicle seat is visibly damaged;

in response to detecting the one or more collision conditions, generate a recommendation to replace the vehicle seat; and provide to a user device, the recommendation to replace the vehicle seat.

* * * * *